United States Patent

[11] 3,565,362

| [72] | Inventors | Larry L. Lilland;<br>James T. Rumbaugh, Spirit Lake, Iowa |
|---|---|---|
| [21] | Appl. No. | 820,859 |
| [22] | Filed | May 1, 1969 |
| [45] | Patented | Feb. 23, 1971 |
| [73] | Assignee | Berkley & Company, Inc.<br>Spirit Lake, Iowa<br>Continuation-in-part of application Ser. No. 778,913, Nov. 1, 1968, which is a continuation-in-part of application Ser. No. 727,832, May 9, 1968, now abandoned. |

[54] REVERSIBLE CARTRIDGE SPOOL STRUCTURE
6 Claims, 8 Drawing Figs.

[52] U.S. Cl............................................. 242/84.21,
242/118.4, 242/129.8
[51] Int. Cl....................................................... A01k 89/00;
B65h 75/14
[50] Field of Search........................................ 242/84.2,
84.21, 84.1, 128, 129.8, 118.4, 129.7

[56] References Cited
UNITED STATES PATENTS
2,773,655  12/1956  Mandolf........................  242/84.21

| 3,023,978 | 3/1962 | Denison et al.............. | 242/84.2X |
| 3,337,157 | 8/1967 | Plog........................... | 242/129.8 |

FOREIGN PATENTS

| 924,148 | 3/1947 | France...................... | 242/84.21 |

*Primary Examiner*—Billy S. Taylor
*Attorney*—Orrin M. Haugen

ABSTRACT: A fishing line receiving spool for use in combination with a fishing line spool flanged mounting hub, the spool having an axial core of generally cylindrical configuration with a pair of end flanges secured to opposite ends thereof, the inner surface of the spool core having at least one key means for engaging the surface of a spool receiving hub, said key means having an axis disposed parallel to the axis of said core, each of said spool flanges having at least one bore formed therethrough and disposed at a point radially inwardly from the outer spool flange periphery. This structure permits the line spool to be received on a flanged mounting hub in either axial direction, thus permitting use in connection with spooling or reeling systems operating in either clockwise or counterclockwise rotation. In addition, the spool flanges are smoothly radiused in order to provide a proper winding surface for the line retained on the spool.

INVENTORS
LARRY L. LILLAND,
JAMES T. RUMBAUGH
BY
Orrin M. Haugen
ATTORNEY

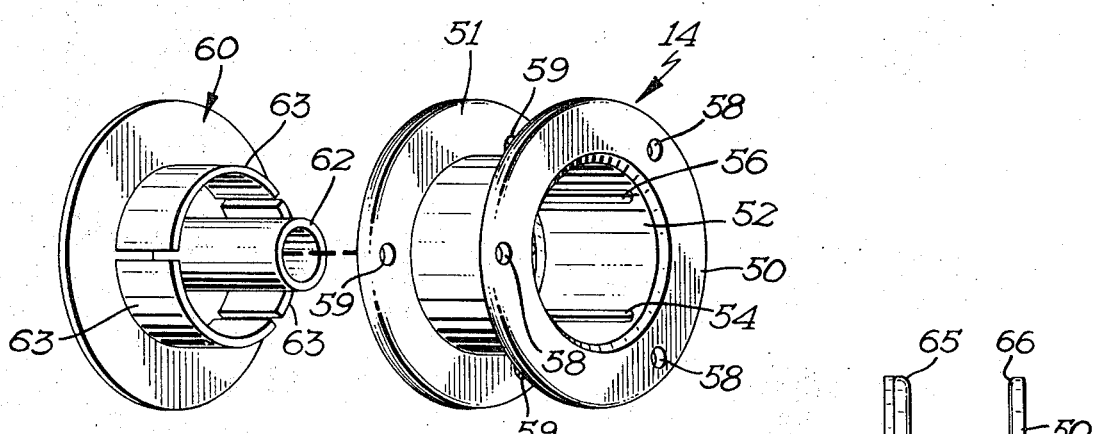
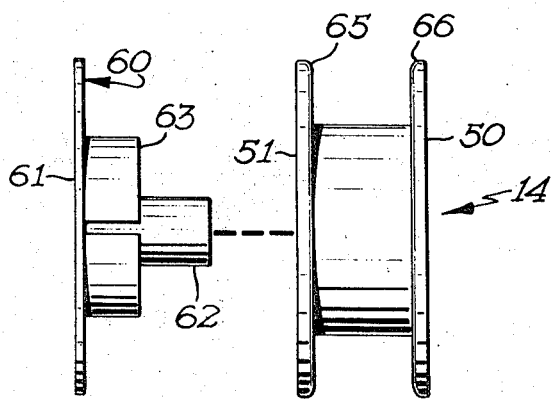
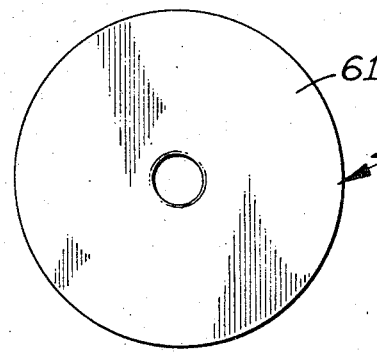
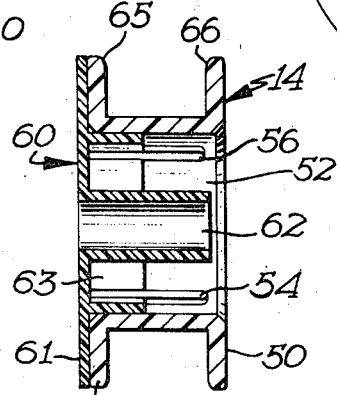

REVERSIBLE CARTRIDGE SPOOL STRUCTURE

SPECIFICATION

The present application is a continuation-in-part of our copending application Ser. No. 778,913, filed Nov. 1, 1968, which application is a continuation-in-part of our prior copending application Ser. No. 727,832, filed May 9, 1968 and now abandoned.

The present invention relates generally to line receiving spools for use in connection with spinning reels and the like, particularly spinning reels equipped with a flanged mounting hub for receiving the fishing line spool thereon. The spool is adapted for ready or convenient interchange, depending upon the immediate requirements of the user. The fishing line receiving spool means is arranged in symmetrical relationship, one end from the other, in order to permit the spool to be utilized in connection with a variety of spinning reels, either clockwise or counterclockwise winding systems, this being achieved without a need for respooling the line in any operating situation.

Spinning reels are utilized in a number of fishing environments, One feature of the spinning reel is its versatility and adaptability for a variety of fishing situations. For example, a single spinning reel structural design will permit its use for fishing pan fish as well as for fishing larger varieties of fish. The fisherman normally adjusts his line in accordance with the immediate fishing situation, and will ordinarily utilize a line weight which is as light as reasonably possible consistent with the variety of species of fish he is seeking. Therefore, as the fisherman changes his immediate fishing situation, he will wish to be able to change his line as well. The versatility of the present spinning reels does not extend to a line interchange situation, and hence the individual desiring to change lines may necessarily be required to substantially dismantle his spinning reel, or otherwise engage in time-consuming operations to accomplish a change in the type of line spooled upon the reel.

In the dispensing of line, it is the current practice to vend line on an ordinary disposable spool, and this line is normally spooled upon the reel by the purchasing fisherman as required. Because of the difficulties inherent in this operation, the ordinary fisherman will generally prefer to obtain a single line with a strength or weight which is consistent with the heaviest duty expected. In accordance with the present invention, however, the line is dispensed and sold on a spool structure wherein the spool is arranged to be received on an adapting arbor which is in turn designed to be mounted on a variety of reels without drastically modifying either the reel or the adapter. Therefore, after the adapter is mounted on a reel, the line may be changed quickly, simply, and readily, without requiring any disassembly of the reel assembly or structure. The spool utilized to carry the line is provided with forward and rear flanges spaced apart by an axial sleeve or core, all of the line contacting surfaces being smooth, regular, and free of projections or indentions which could reasonably interfere with the winding of the line. The spool structure is substantially symmetrical, from the forward face to the rear face, thus permitting the spool to be employed on a wide variety of reels, including reels with either a clockwise or counterclockwise winding rotation.

In accordance with the present invention, a line receiving spool is provided having at least one key means for engaging the surface of a spool receiving hub, the key means being disposed generally parallel to the axis of the spool, and in addition, is preferably provided with at least one bore formed through each of the spool flanges at a point disposed radially inwardly from the spool flange periphery. The bore is utilized to receive and accommodate a projecting pin which is formed in the mounting hub arrangement in order to assist the user in verifying that the structure is mounted at a proper axial disposition. As indicated, these bores are formed on each of the spool flanges, in order to provide proper symmetry to permit versatility in mounting.

Briefly, the spools of the present invention are utilized in combination with an adapting arbor, the arbor being arranged to removably mount and releasably retain a line receiving spool thereon. The arbor is normally provided with a boss portion and a flange portion, the boss portion having key means for lockingly engaging the spool against relative rotation with the adapting arbor, the flange portion having projecting pin means for permitting additional locking engagement, and also for permitting the user to verify the axial disposition of the line receiving spool. In addition, means are provided along the boss or hub of the adapting arbor for frictionally engaging the inner periphery of a line receiving spool and thereby hold the spool in proper axial disposition along the adapting arbor. The line receiving spool of the present invention may be readily mounted on such a structure without necessitating any significant axial rotation of the spool, and furthermore, without necessitating any prior disassembly of any portion of the reel structure.

Therefore, it is an object of the present invention to provide an improved spinning reel line receiving spool which is particularly adapted for ready interchange on an adapting arbor means, the spool being adapted to accomplish the interchange regardless of the line winding direction of the reel.

It is yet a further object of the present invention to provide an improved line receiving spool having a core with a plurality of symmetrically arranged key means for engaging the surface of a spool receiving hub, the flanges of the spool being provided with through-bores for engaging pins which will resist relative axial rotation between the spool and the hub, and which will also permit a visual verification of the axial disposition of the spool on the hub.

Other and further objects of the present invention will become apparent to those skilled in the art upon a study of the following specification, appended claims, and accompanying drawings wherein:

FIG. 3 is a perspective view of a spool prepared in accordance with the present invention, and showing, in exploded view therewith, a spool engaging device having a flanged indicia receiving surface, and having a hollow concentric sleeve arranged for convenient handling of the spool;

FIG. 4 is a side elevational view of the spool and plate member shown in FIG. 3;

FIG. 5 is a front elevational view of the device shown in FIG. 4, with the indicia receiving surface secured to the line receiving spool;

FIG. 6 is a vertical sectional view taken along the line and in the direction of the arrows 6—6 of FIG. 7;

FIG. 7 is a rear elevational view of the structure shown in FIG. 5; and

FIG, 8 is a side elevational view of the line receiving spool and indicia receiving surface arranged in coupled relationship.

Figure 1:
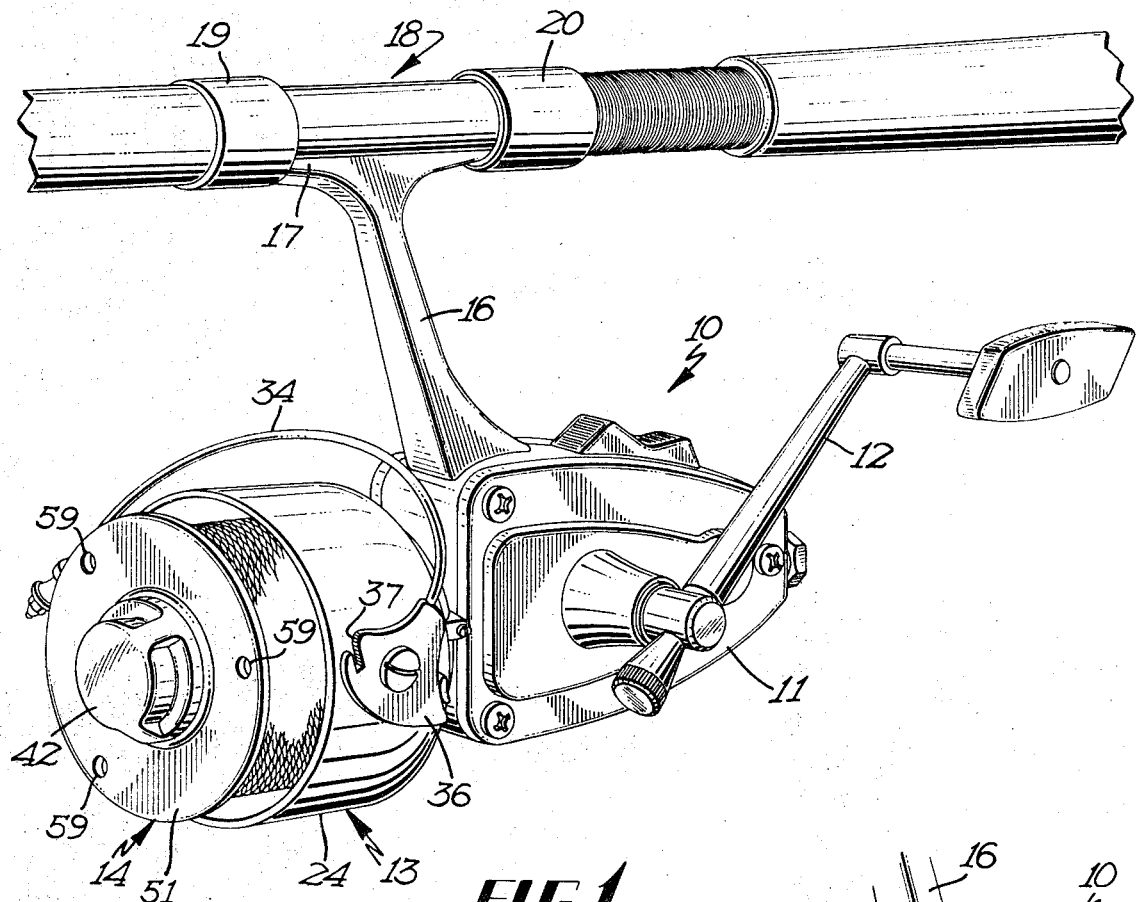
FIG. 1 is a perspective view illustrating the adapter unit of the present invention as being mounted on a conventional fishing rod.
Figure 2:
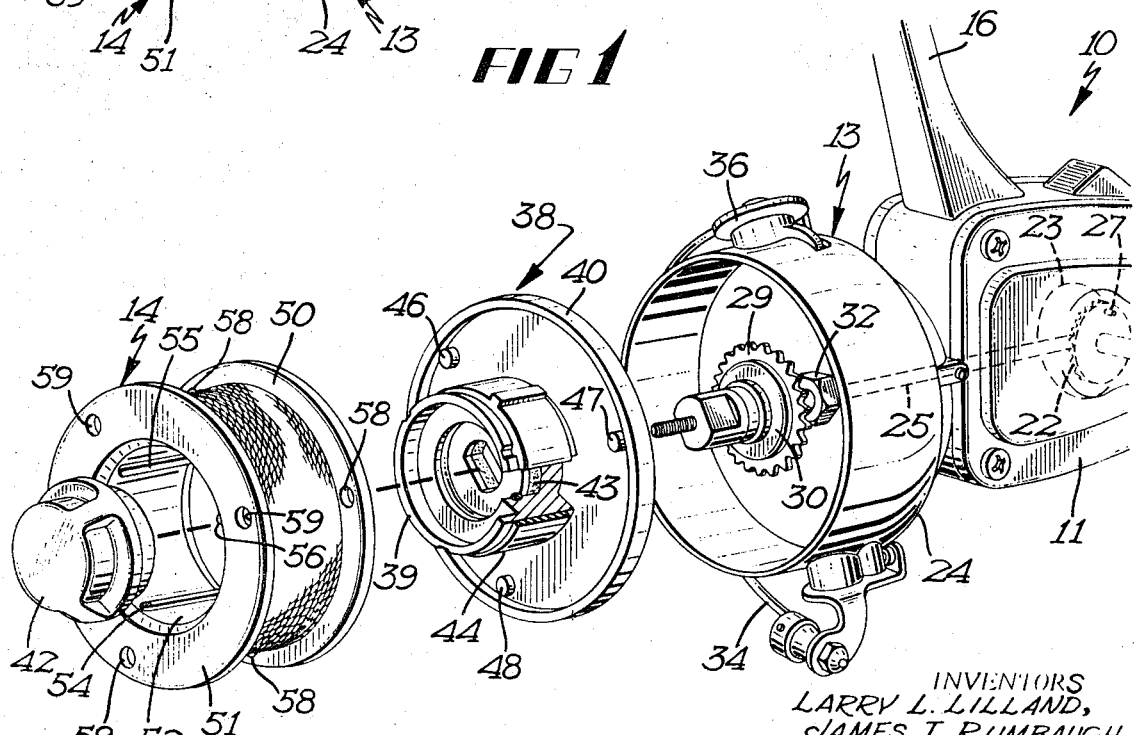
FIG. 2 is a perspective view showing the components of the reel in exploded disposition, certain of the components being partially broken away to illustrate internal features.

In accordance with the preferred modification of the present invention, and with particular attention being directed to FIGS. 1 and 2 of the drawings, the spinning reel generally designated 10 having a main housing 11 to which is attached the crank handle 12 and the spooling assembly shown generally at 13 is provided with a line receiving spool prepared in accordance with the present invention, such as is shown at 14. In FIG. 1, the line receiving spool 14 is shown mounted on the spinning reel 10, FIG. 2 showing the structure in exploded disposition.

In order to cast a proper environment for use of the spool of the present invention, the structure of the spinning reel generally designated 10 will be discussed. The main housing 11 of the spinning reel 10 includes a bracket member 16 which terminates in a shoe 17 for mounting to the fishing rod shown generally at 18. Conventional attaching means such as the clamps 19 and 20 may be utilized to lockingly engage the extensions of the mounting shoe 17 to clamp the reel 10 onto the rod 18.

The operational features of the drive mechanism for the reel 10 are conventional. For example, as is illustrated in FIG. 2, the crank handle 12 is coupled to a drive gear 22 which meshes with the pinion 23, pinion 23 being secured or coupled at its opposite end to the spool cap 24. Also, as is indicated in FIG. 2, pinion 23 is disposed coaxially with and about the shaft 25, shaft 25 being adapted to reciprocably oscillate during rotation of the drive gear 22. On the inner face of drive gear 22, an eccentrically disposed dog is disposed as at 27, this dog engaging a slide guide member which is coupled to the shaft 25 and provides for the reciprocable oscillation thereof. Within the spool cap 24, and along the axial extent of shaft 25, a base collar 29 is disposed, base collar 29 having a friction washer such as the fiber washer 30 disposed adjacent thereto. The pinion nut 32 along with appropriate washers, couple the pinion gear 23 to the spool cap 24, and thus provide for rotation of the cap 24 together with simultaneous reciprocable oscillation of the shaft 25. As is conventional in spinning reels, the spool cap 24 is provided with bail arm 34, bail arm 34 being coupled to spool cap 24 by appropriate means. The bail arm is adapted for pivotal rotation about its central axis, a bail hinge member 36 being provided to permit the bail arm 34 to be selectively disposed in either operational or retracted disposition, depending upon whether the line is being taken up or permitted to play out. The bail arm 34 is provided with a notch as at 37 to permit engagement with a locking link or dog arm mechanism. Suitable hubs are provided in the spool cap 24, when required.

Turning now to the spool retaining portion of the device, an adapting arbor generally designated 38 is provided having a boss portion 39 and a rear flange 40, the boss portion 39 being adapted to receive spool 14 coaxially thereon. The drag adjusting knob 42 is utilized to control the frictional drag on the combined adapter 38 and spool 14.

The adapting arbor 38 is provided with frictional means 43 for controlling the drag of the mechanism, frictional means of this type being disclosed in our prior copending application. In addition, a cylindrical ribbed member 44 is provided having radially extending protrusions for controlling the axial disposition of the spool 14, and resisting axial motion of the spool 14 on the boss 39. In addition, the adapting arbor is provided with axially projecting pins such as at 46, 47, and 48. It will be observed that these pins are arranged in symmetrical disposition, each being spaced 120° of arc from its neighbor.

Turning now to the details of the spool forming the concept of this invention, the spool 14 is provided with a pair of flanges 50 and 51, these flanges being disposed on opposite sides of a central cylindrical core 52. The spool flanges 50 and 51 are symmetrical, in order to permit the spool to be received on a winding arbor in either winding direction, For example, a plurality of keys are provided as at 54, 55 and 56, these keys likewise being disposed in symmetrical relationship, one to another. In other words, each individual key is disposed at 120° of arc from its neighbor. Since the keys are arranged generally parallel to the axis of the core, they do not interfere with mounting in either axial disposition.

Each flange of the spool 14 is provided with a plurality of through-bores, such as the through-bores 58—58 on the spool flange 50, and the bores 59—59 on the flange 51. Since these bores are symmetrically arranged, each being disposed 120° of arc from its neighbor, the spool does not lose its versatility for mounting direction.

Turning now to the accessory structure shown in FIG. 3, it will be observed that the winding hub member 60 is provided with an indicia receiving surface 61 together with a cylindrical hub or winding sleeve 62. Arcuate retaining members 63—63 are provided to assist in retaining the member 60 within the confines of the core 52 of the spool. The member 60 may be utilized whenever it is desired to remove the line from the spool 14.

The peripheral contour of the individual flanges 50 and 51 is radiused in order to provide a smooth winding surface, such as is shown at 65 and 66. Furthermore, as is indicated, the individual through-bores 58—58 and 59—59 are arranged at a radial distance from the outer peripheral edges of the individual spool flanges, thus assuring rigidity in the structure so as to avoid breakage should stresses occur between the bores and the surface of any projecting pin.

As an additional feature of spools of this type, it is possible to render the diameter of the individual cores of varying dimension so as to provide a proper radial disposition of varying line weights, whenever constant or standard length of line are desired.

The structure disclosed herein provides for a wide variety or degree of tolerance levels in manufacture. Because of the overall design, the smallest diameter of bore for the spool is equal to that diameter which would provide an interference fit with the body of the adapter. Obviously, the adapter being fit with a cylindrical member 44 having radial protrusions extending therefrom, can be designed so as to accommodate a spool which is commencing an interference fit with the adapter. For example, one adapter commercially available from Berkley & Co., Inc. of Spirit Lake, Iowa has a hub diameter of 1.238 inches. On the other hand, the largest dimension for the spool bore diameter is equivalent to the diameter of the circle generated by the radial protrusions upon axial rotation thereof. When ordinary medium firm rubber is employed, the diameter of such a circle is 1.295 inches. For most purposes, the cross-sectional thickness of the web of the member 44 is about 0.2 inch.

There is also a tolerance available for the outer flange of the spool. For most reel structures, the outer flange should not exceed 2.330 inches, and the minimum usable diameter must, of course, exceed the outer diameter of the bores formed in the spool flanges in order to provide strength at that point. The useful variations in the outside diameter of spools for fresh water spinning reels ranges, accordingly, from about 1.944 inches up to about 2.330 inches.

As previously indicated, it is possible to vary the thickness of the core of the spools in order to achieve a proper level of "fill" for various line weights. For a spool having an inner bore diameter of about 1.283 inches, various core thicknesses may be employed depending upon the line weight to be spooled thereon. For 100 yards of 2-pound nylon monofilament, a core thickness of about 0.176 inch has been found useful, while for 14-pound test nylon monofilament, a core thickness of 0.096 inch has been found useful. Thus, the core thickness may be varied depending upon the line usage, to fill the spool in each instance and provide good operating characteristics.

We claim:

1. Fishing line spool means for use in combination with a fishing line spool flanged mounting hub, said spool comprising:

a. an axial core of generally cylindrical configuration having a pair of end spool flanges secured to opposite ends thereof,
    b. the inner surface of said core having at least one key means for engaging the surface of a spool receiving hub, said key means having an axis disposed parallel to the axis of said core,
    c. each of said spool flanges having at least one bore formed therethrough and disposed at a point radially inwardly from the outer spool flange periphery.

2. The fishing line spool means as defined in claim 1 being particularly characterized in that the inner surface of said core has three symmetrically disposed keys formed therein, and each of said spool flanges has three bores formed therethrough, said bores being disposed at equal radial distances from the axis of said core, and being arranged symmetrically, one with another.

3. The fishing line spool means as defined in claim 1 being particularly characterized in that each of said key means and spool flange bores is disposed symmetrically radially and axially.

4. The fishing line spool means as defined in claim 1 being particularly characterized in that the inner edge surface of each of said spool flanges is radiused.

5. The fishing line spool means as defined in claim 1 being particularly characterized in that said spool flanges are symmetrically arranged, one with respect to the other.

6. Fishing line spool means for use in combination with a fishing line spool flanged mounting hub having radially disposed pins projecting axially forwardly on the flange of the mounting hub, said spool comprising:

a. an axial core of generally cylindrical configuration having a pair of end spool flanges secured to opposite ends thereof, b. the inner surface of said core having at least one key means for engaging the surface of a spool receiving hub, said key means having an axis disposed parallel to the axis of said core, c. each of said spool flanges having a bore formed therethrough for accommodating the said projecting pin.

UNITED STATES PATENT OFFICE
CERTIFICATE OF CORRECTION

Patent No. 3,565,362          Dated February 23, 1971

Inventor(s) Larry L. Lilland and James T. Rumbaugh

It is certified that error appears in the above-identified patent and that said Letters Patent are hereby corrected as shown below:

Column 4, line 72, Claim 3, the claim reference numeral "1" should read -- 2 --.

Signed and sealed this 22nd day of June, 1971.

(SEAL)
Attest:

EDWARD M. FLETCHER, JR.          WILLIAM E. SCHUYLER
Attesting Officer          Commissioner of Pat